United States Patent Office 3,345,061
Patented Oct. 3, 1967

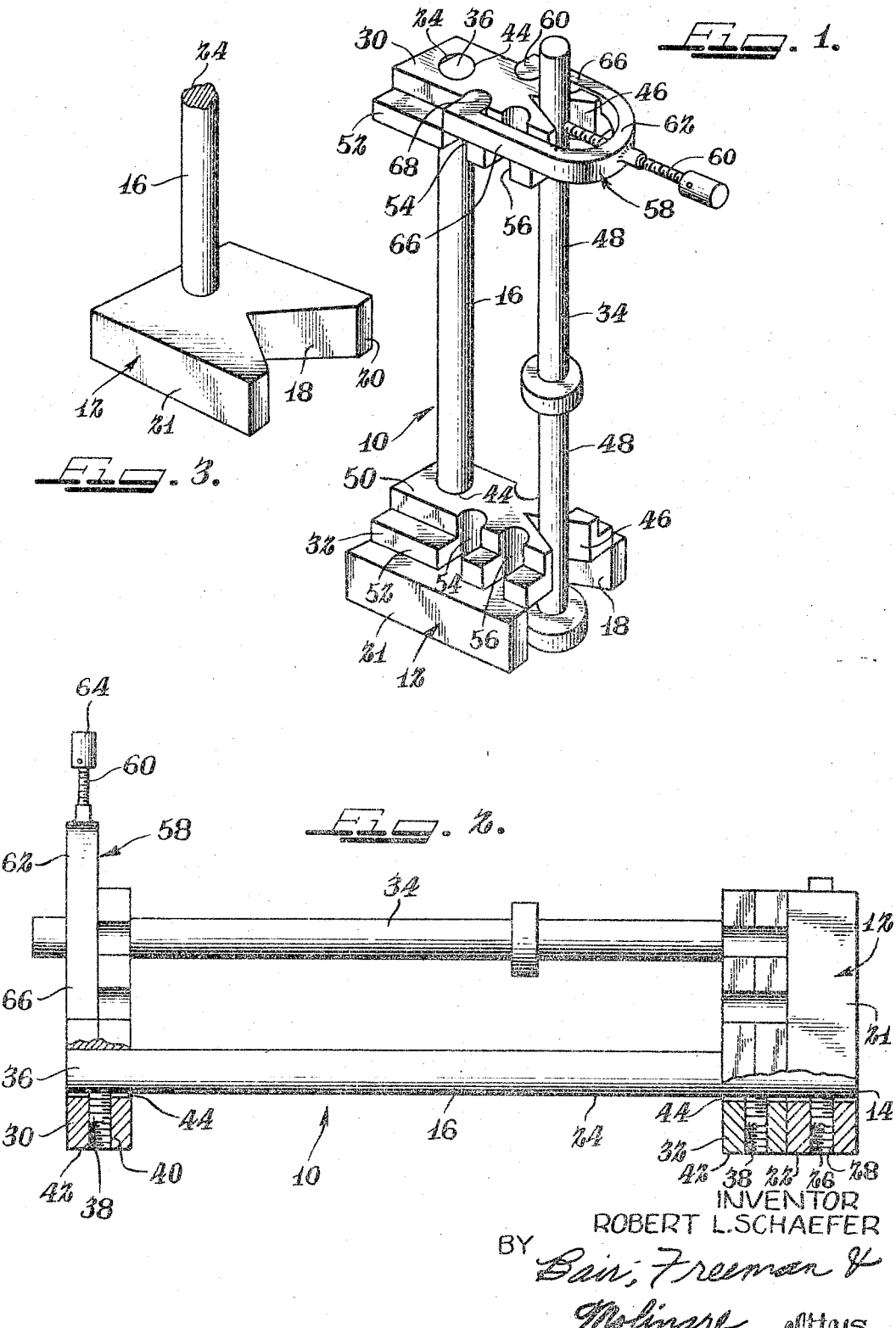

3,345,061
MACHINING FIXTURE
Robert L. Schaefer, 6121 W. Barry, Chicago, Ill. 60634
Filed Nov. 23, 1964, Ser. No. 413,242
4 Claims. (Cl. 269—246)

ABSTRACT OF THE DISCLOSURE

A device for holding pieces of metal stock and the like which are to be machined in a fixed, immovable position by clamping the stock in V-shaped notches cut into mounting blocks. The blocks are slidably mounted, aligned, and secured to a shaft which is secured substantially normal to a base plate.

---

This invention relates to an improved fixture for securely maintaining objects, particularly elongated circular cross-section objects during the machining thereof, including grinding, milling, and drilling.

It is an important object of this invention to provide an improved machining fixture for securement of the objects being machined, wherein the fixture is highly adaptable for use in connection with objects of varying sizes.

It is also an object of this invention to provide an improved machining fixture which is particularly useful for securely maintaining elongated circular cross-section objects in fixed position during machining operations wherein the fixture may be used with objects of widely varying lengths and diameters, may be used in both the vertical and horizontal positions, and may be used for various types of machining operations including grinding, drilling and milling.

It is a further object of this invention to provide an improved machining fixture which is not only highly flexible in use but which is also characterized by its simplicity and economy of construction and use, regardless of the dimensions of the object being machined and regardless of the type of machining operations being performed thereon.

Further purposes and objects of this invention will appear as the specification proceeds.

A particular embodiment of the present invention is illustrated in the accompanying drawings wherein;

FIGURE 1 is a perspective view of my improved machining fixture with an elongated object to be machined secured therein;

FIGURE 2 is a front elevational view of my machining fixture while in the horizontal position; and FIGURE 3 is a perspective view of only the support shaft connected to the base of my improved fixture.

Referring to the drawings, my improved fixture, generally 10, is provided with a heavy metallic base 12 which is firmly secured to one end portion 14 of a support shaft 16. The base 12, preferably of steel construction, is provided with a cut-out portion 18 which is substantially parallel with the support shaft 16, also preferably of steel construction. The cut-out area 18 extends through the forward front side 20 of the base 12. The shaft 16 is located intermediate the sides 21 of the base 12 and is in close proximity to the rear side 23 of the base 12.

The shaft 16 is provided with a flattened portion 24 which extends along its entire length. The shaft 16 passes through a bore in the base 12 and is secured thereto by a set screw 26 which is threaded into a threaded aperture 28 in rear 22 of the base 12, the aperture being normal to the shaft 16. The set screw 26 bears firmly against the flattened portion 24 in order to avoid rotation of the shaft 16 within the base 12 while firmly securing the base 12 and shaft 16 together. The cut-out portion 18 of the base 12 may be of any suitable form, such as the V-shaped configuration shown in the drawings.

The fixture 10 has adjustably mounted thereon a pair of movable block members 30 and 32 which are slidable along the entire length of the shaft 16. Although two block members 30 and 32 are shown, only one block member need be used, if desired. For most firm securement, it is preferred that both block member 30 and 32 be used. Block member 30 is positioned at the upper end or end 36 opposite the secured end 14 of the shaft 16 and the other block member 32 is positioned intermediate the first block member 30 and the base 12. Both block members 30 and 32 are slidably adjustable relative to the shaft 16 and each utilizes a set screw 38 which is threaded into a threaded base 40 at the rear side 42 of each block member 30 and 32. The shaft 16 is slidable within the bores 44 provided in each of the block members 30 and 32. The set screws 38 enter the bores 44 and are caused to bear against the elongated flat 24 on the shaft 16 to thereby provide firm securement of the blocks 30 and 32 thereto when each is at a desired position along the shaft 16. Thus, the movability of the blocks 30 and 32 along the shaft 16 to positions of variable securement thereon enables the fixture 10 to accommodate variable length elongated members 34 for machining.

Each block member includes a cut-out portion 46 which has its sides substantially parallel to the shaft 16. Preferably, the cut-outs 46 are V-shaped in configuration so that the blocks 30 and 32 are particularly useful for receiving an elongated circular cross-section member 34 therein. It is important that the cut-out portions 46 be in substantial alignment with each other and be of substantially the same dimension so that equal diameter portions, as 48, of the member 34 may be received by the cut-out portions 46 at substantially the same position in each block. Alignment is maintained between the cut-outs 46 since the set screws 38 in each block are positioned substantially normal to the flat 24 of the shaft, whereby each block is held at substantially the same position relative to the shaft. For the same reasons, the base cut-out 18 is maintained in alignment with the cut-outs 46.

The block members 30 and 32 each have an inwardly stepped upper portion 50 which is restricted in comparison to the lower portion 52 thereof. At the lateral sides of each block, rearward and forward laterally opening slots 54 and 56 are provided and intersect with the stepped upper portion 50. Each set of lateral slots 54 and 56 is provided for cooperating with a clamp member 58 which physically secures the elongated circular member 34 to the fixture 10.

Each clamp member 58 is of U-shaped construction having a threaded stud 60 which is threaded through the bight portion 62 of the clamp 58. The stud 60, which may be turned by gripping the head 64 thereof, has an end which bears against the portion of the elongated member 34 which is received within the V-shaped slot 46 of a block 30 or 32. The legs 66 of the U-shaped clamp 50 are each provided with inturned portions or ears 68 which are received within either set of the upright slots 54 or 56 so as to secure the clamp to a block as the stud is tightened against the elongated member 34 thereby securing the member 34 to the fixture 10. Although only one clamp member is shown in the drawing, two clamps may be used. The provision of forward and rearward lateral slots 54 and 56 and the provision of stepped portions 52 and 54 on the blocks 30 and 32, results in a significant advantage since it is possible to utilize clamps 58 of varying dimensions for securing elongated circular members 34 of varying diameters to the fixture 10.

It is desirable to have the cut-out portion 18 in the base 12 at a larger dimension than the cut-out portions 46 of the blocks 30 and 32 so that wider diameter sections of the elongated member 34 may be received within the larger space, while the equal diameter portions of the shaft 16 are received with the V-shaped openings in the blocks 30 and 32. My construction 10 enables practically any elongated circular member 34 to be maintained in firm securement to the fixture 10, regardless of length, diameter, or presence of widened portions along its length. It is also of importance that the rear sides of both blocks 30 and 32 and the base 12 be in substantial alignment so that the fixture 10 may be used in the horizontal position, as shown in FIGURE 2.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. A fixture for securely holding an elongated substantially circular object during machining operations, said fixture comprising a base, a shaft normal to said base and having a lower end fixed to said base, a first block member slidably mounted along said shaft in spaced relationship with said base, a second block member slidably mounted along said shaft and positioned intermediate said base and said first block member, a cut-out portion in each of said first and second blocks for receiving spaced, substantially equal diameter portions of said object therein, means for aligning and fastening said blocks such that the cut out portions are substantially aligned with each other, said cut out portions being of substantially the same configuration, and a clamp engaging at least one of said block members and receiving said object in said one block during machining operations.

2. A fixture for securely holding an elongated cylindrical object during machining operations, said fixture comprising a fixed base, a shaft fixed at one end to said base and being substantially perpendicular thereto, a first block member slidably positioned on and toward the other end of said shaft, a second block member slidably mounted on said shaft intermediate said first block member and said base, V-shaped cut-out portions of substantially equal dimensions in each of said block members, said cut-out portions being in substantial alignment with each other, the sides defining said cut-out portions being substantially parallel with said shaft, said cut-out portions receiving said cylindrical objects therein, a cut-out portion in said base in substantial alignment with the V-shaped cut-out portions in and being of greater dimension than the V-shaped cut-out portions in said block members so as to receive portions of said object, and at least one clamp member engaging one of said block members for firmly securing said object to said one block member, whereby said elongated member is held in firm securement during machining operations.

3. The device of claim 2 wherein said clamp member is a U-shaped clamp having inturned portions, said block members each being of stepped construction for receiving U-shaped clamps of varying dimensions, said block members also including pairs of spaced, laterally opening slots for engaging said inturned portions.

4. The device of claim 2 wherein said shaft has a flat surface defined thereon, parallel to the length of said shaft, and said first block member is fixed on said shaft by means of a fastening screw passing through said first block and abutting said flat shaft surface so that said block is held in a non-slidable, non-rotatable position, and said second block member is fixed on said shaft by means of a fastening screw passing through said second block and abutting said flat shaft surface so that the second block is held in a non-slidable, non-rotatable position.

References Cited
UNITED STATES PATENTS

| | | | |
|---|---|---|---|
| 1,802,914 | 4/1931 | Gruber | 269—246 X |
| 2,614,519 | 10/1952 | Paladino | 248—313 X |
| 2,970,798 | 2/1961 | Fritchle et al. | 248—125 X |
| 3,103,352 | 9/1962 | Steffen | 248—62 X |

WILLIAM W. DYER, Jr., *Primary Examiner.*

W. D. BRAY, *Assistant Examiner.*